(12) United States Patent
Dodeja et al.

(10) Patent No.: US 8,868,034 B2
(45) Date of Patent: Oct. 21, 2014

(54) SECURE WIRELESS DEVICE AREA NETWORK OF A CELLULAR SYSTEM

(75) Inventors: Rakesh Dodeja, Portland, OR (US); Ashok Sunder Rajan, Burnaby (CA); Kevin D. Johnson, Happy Valley, OR (US); Martin Mcdonnell, Ennis (IE); William J. Tiso, Hilton Head Island, SC (US); Todd A. Keaffaber, Lake Oswego, OR (US); Adam P. Burns, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/978,562

(22) Filed: Dec. 25, 2010

(65) Prior Publication Data

US 2012/0164975 A1 Jun. 28, 2012

(51) Int. Cl.
 *H04M 1/66* (2006.01)
 *H04W 12/06* (2009.01)
 *H04W 12/08* (2009.01)

(52) U.S. Cl.
 CPC .............. *H04W 12/06* (2013.01); *H04W 12/08* (2013.01)
 USPC ................. 455/410; 455/411; 726/7; 726/12; 726/21

(58) Field of Classification Search
 CPC ..... H04W 12/12; H04W 12/06; H04W 88/02; H04L 63/08; H04L 63/0281; H04L 63/0428; G06F 21/31; G06F 63/08; G06F 21/6218
 USPC ...................... 455/410, 411; 726/7, 12, 21–30
 See application file for complete search history.

(56) References Cited

U.S. PATENT DOCUMENTS

| | | | |
|---|---|---|---|
| 2003/0078029 A1* | 4/2003 | Petite | 455/404 |
| 2004/0183687 A1* | 9/2004 | Petite et al. | 340/601 |
| 2005/0201397 A1* | 9/2005 | Petite | 370/401 |
| 2005/0243867 A1* | 11/2005 | Petite | 370/474 |
| 2006/0271695 A1 | 11/2006 | Lavian | |
| 2007/0079012 A1* | 4/2007 | Walker | 709/249 |
| 2008/0120714 A1 | 5/2008 | Monette et al. | |

(Continued)

FOREIGN PATENT DOCUMENTS

| | | |
|---|---|---|
| WO | 2012/088408 A2 | 6/2012 |
| WO | 2012/088408 A3 | 11/2012 |

OTHER PUBLICATIONS

International Search Report and Written Opinion received for PCT Patent Application PCT/US201/066830, mailed on Sep. 19, 2012, 9 pages.

*Primary Examiner* — Wayne Cai
(74) *Attorney, Agent, or Firm* — Schubert Law Group PLLC

(57) ABSTRACT

Embodiments may comprise logic such as hardware and/or code to provide a secure device area network. Many embodiments comprise a gateway node or enterprise enhanced node with a services distribution frame installed on a customer's premises. The gateway node or enterprise enhanced node may interconnect the secure wireless device area network at the customer's premises with a cellular network. In many embodiments, the cellular network core may provision authentication credentials and security keys, and manage access polies to facilitate access by Application Service Providers to devices on premises including smart devices via a security and policy enforcement function of a services distribution frame of the gateway node or enterprise enhanced node, Authorized members of the secure wireless device area network may connect to the Wide Area Network (WAN) through the gateway node and the cellular network core.

20 Claims, 5 Drawing Sheets

(56) References Cited

U.S. PATENT DOCUMENTS

| | | |
|---|---|---|
| 2009/0157529 A1* | 6/2009 | Ehlers et al. ................ 705/26 |
| 2009/0165114 A1* | 6/2009 | Baum et al. ................ 726/12 |
| 2010/0127850 A1* | 5/2010 | Poder ........................ 340/517 |
| 2010/0149335 A1* | 6/2010 | Miller, II ................... 348/148 |
| 2010/0153853 A1* | 6/2010 | Dawes et al. ............... 715/736 |
| 2010/0161710 A1 | 6/2010 | Stoner et al. |
| 2010/0199188 A1* | 8/2010 | Abu-Hakima et al. ..... 715/733 |
| 2010/0280637 A1* | 11/2010 | Cohn et al. .................. 700/90 |
| 2011/0085525 A1* | 4/2011 | Patini ......................... 370/338 |

* cited by examiner

SECURE WIRELESS DEVICE AREA NETWORK OF A CELLULAR SYSTEM

BACKGROUND

The present disclosure relates generally to cellular technologies. More particularly, the present disclosure relates to secure device area network for a cellular system to extend and manage services provide services for devices.

Currently, the extension of services by cellular network providers is limited to devices for which they have full management control, e.g., cell phones and "direct node" devices. "Direct node" devices are cell phone-like devices for Voice, Data, and Voice+Data with a subscriber plan. These devices today are typically end point devices mostly under human control.

The cell phone and cell phone like devices will soon grow to an un-manageably large number and require a gateway class device. Today, there is no secure mechanism and process to extend and manage the Cellular network to devices behind the gateway.

DETAILED DESCRIPTION OF EMBODIMENTS

Figure 1:
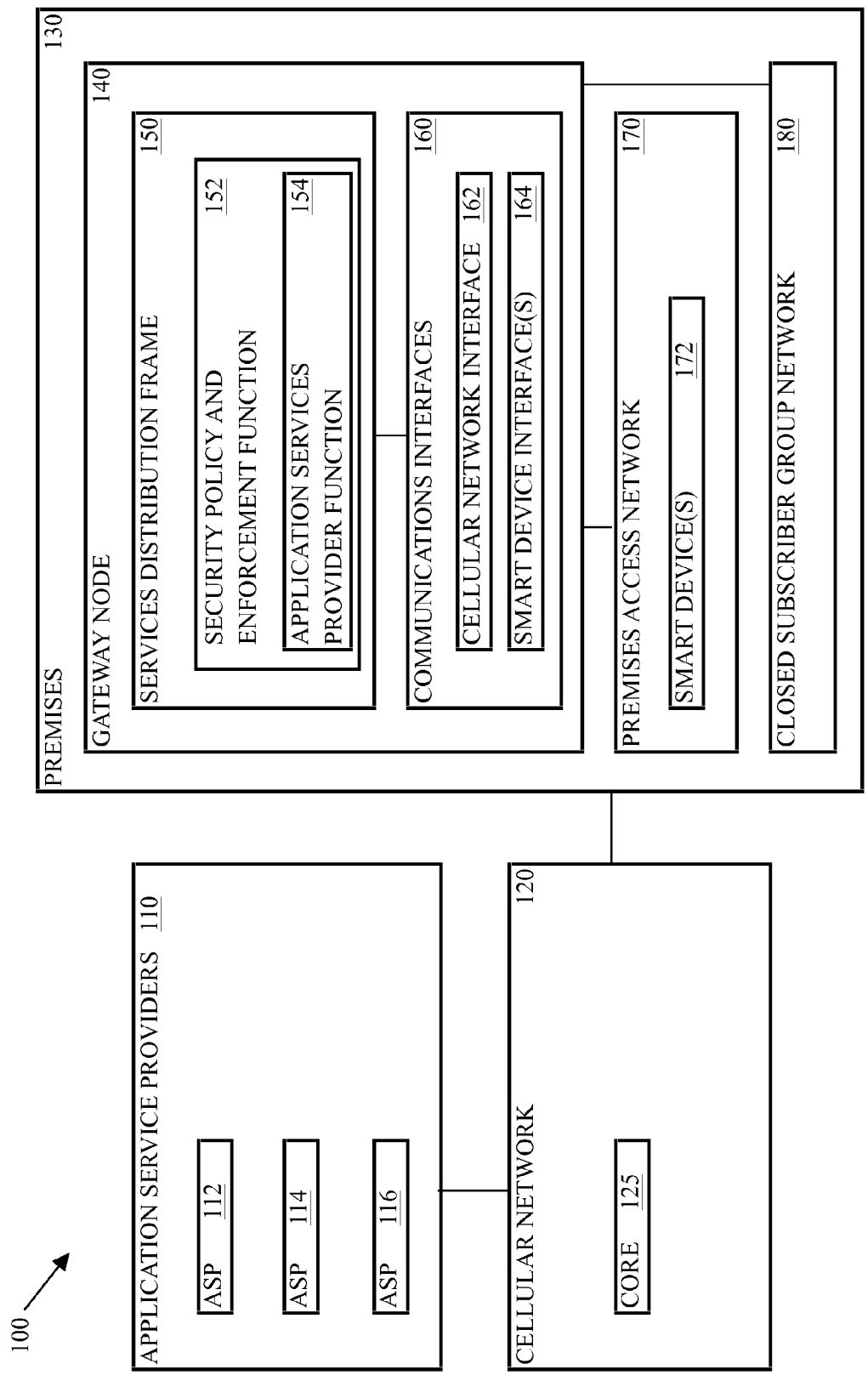
FIG. 1 depicts an embodiment of a system to provide applications via an application service provider to a secure wireless device area network of a cellular system.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, embodiments to extend and manage the cellular network to devices behind the gateway are described herein. Embodiments may comprise logic such as hardware and/or code to provide a secure wireless device area network (SWDAN). Note that the SWDAN is referred to as wireless due to the provision of services from a cellular network and may include hardwired elements. Many embodiments comprise a gateway node or enterprise enhanced node with a services distribution frame installed on a customer's premises. The gateway node or enterprise enhanced node may interconnect the SWDAN at the customer's premises with a cellular network. In many embodiments, the cellular network core may provision authentication credentials and security keys, and manage access polies to facilitate access by Application Service Providers to devices on premises including smart devices via a security and policy enforcement function of a services distribution frame of the gateway node or enterprise enhanced node, Authorized members of the SWDAN can connect to the Wide Area Network (WAN) through the gateway node and the cellular network core.

Some embodiments may offer the customer the convenience of consolidating a number of different services for the premises through a single provider that is the cellular network operator while allowing the cellular network operator the opportunity to be the nodal source of a number of different services for customers. For instance, the customer may be a residential user and may obtain services for phones, mobile phones, security alarms, fire alarms, home automation, and the like through the customer's cellular network operator. The cellular network operator can negotiate contracts for the services that are available to the customer. In some embodiments, the cellular network operator may negotiate contracts with a selected number of one or more Application Service Providers (ASPs) to offer services to the customers of the cellular network operator. In further embodiments, the cellular network operator may provider a standard contract for all ASP's that want to offer services to the customers of the cellular network operator.

The services distribution frame may facilitate management of services provided to the SWDAN by the cellular system and/or a third party via the cellular system. In many embodiments, the gateway node or enterprise enhanced node with the services distribution frame can provide services such as local private branch exchange (PBX) management, content delivery to or from an indirect node device, formation and use of a Closed Subscriber Group (CSG) within the confines of the premises (closed cell), access to local resources through the resource nodes, audio & video media/entertainment streaming, audio/video conferencing services, energy management and control services, data/personal computer connectivity services, video/photo camera services, temperature/environment management and control services, services related to other environment sensors, and the like.

The services distribution frame may comprise a security policy and enforcement function (SPEF) to facilitate the provision of services and may manage and coordinate access by a number of different service providers. For example, customer may want to employ the services of a third party, ASP to monitor a security surveillance system comprised of smart devices. To provide the services to the customer, the services distribution frame with the SPEF allows the ASP to provision a number of items. First, the ASP can verify that the customer is a registered subscriber. Second, the ASP can access video from, e.g., a smart sensor surveillance camera on the customer's premises. Third, the ASP can control certain functions of the smart devices on the customer's premises such as zoom control for and movement control of the surveillance camera.

To provide such services to the ASP, the SPEF may include, for each ASP, authentication services, encryption services, premises access network (PAN) resources such as the smart devices like the surveillance camera, wide area network (WAN) resources, and a priority assignment to facilitate an ASP's ability to provide services to a customer. In many embodiments, an ASP's privileges to access devices and resources is limited to the extent the specific ASP requires to perform the services within the scope of the agreement with the cellular network operator and contracted by the customer. For example, an ASP may contract with the cellular network operator to provide security services to customers and may contract with the customer to provide security services to the customer. The SPEF may restrict access of the ASP to the management and control of security class, smart devices such as surveillance cameras, door locks, security switches, proximity sensors, vibration sensors, and other security class sensors. The ASP, however, may not have access to devices within other classifications such as energy management and control devices, audio and video conferencing devices, audio and video streaming entertainment devices, data and computer connectivity devices, or the like.

Many embodiments comprise smart devices with unique identifications and classes. For example, the smart devices may comprise unique serial numbers and be associated with classes such as security switches, power switches, dimmer switches, door locks, temperature sensors, humidity sensors, smoke sensors, heat sensors, energy management and control devices, voltage sensors, current sensors, audio and video conferencing devices, audio and video streaming entertainment devices, data and computer connectivity devices, video/photo camera devices, PBX management devices, and the like.

In some embodiments, the smart sensors may be associated with multiple classifications. In several of these embodiments, the smart devices may have a primary classification as well as additional classifications. In further embodiments, the customer, cellular network operator, or ASP may be able to establish, update, or re-classify smart devices. For instance, a smart sensor may offer multiple functions such as a fire detector with built-in video surveillance capabilities. In some embodiments, the smoke detection functionality may be in a fire protection class and the video surveillance may be classified in a security class. The cellular network operator may contract with one or more ASPs for security services, one or more ASPs for fire protection services, and one or more ASPs for both security and fire protection services. The cellular network operator may facilitate support in the services distribution frame via the SPEF for inclusion of ASPs with only fire protection services, ASPs with only security services, and ASPs with both fire protection services and security services. In many embodiments, the SPEF would provide access for the smoke detection functionality to the ASPs with only fire protection services and ASPs with both fire protection services and security services.

In further embodiments, the smart device with the smoke detection functionality and the video surveillance functionality may be primarily classified in a security class and thus, would not be accessible to the ASPs with only fire protection services. In still further embodiments, the smart device may be reclassified as primarily in a fire protection class and thus be accessible by the ASPs with only fire protection services and the ASPs with both fire protection services and security services. In such embodiments, however, the SPEF may not provide access to video content from the video surveillance functionality to the ASPs with only fire protection services unless their services specified usage of video surveillance in fire protection class smart devices.

The smart devices may be zero touch devices in that they can be securely enabled, disabled, activated, deactivated, configured, updated, upgraded, reset, rebooted, and the like remotely and with a secure code execution environment.

In many embodiments, the services distribution frame may automatically detect and log new smart devices after installation. For example, if a user purchases a set of smart devices that have a consecutive series of serial numbers and/or that belong to a specific class of smart devices, the user may access a device management application available through the services distribution frame after installing the smart devices and the device management application may automatically discover the new devices. The device management application may present the user with a list of the serial numbers and/or device classes for the newly installed smart devices along with a request that the user verify an intention to install the smart devices. The device management application may remotely configure and activate the smart devices in response to a single affirmative response.

In some embodiments, a service provider may provide devices to a user. The service provider may, for instance, lease or rent the smart devices to the user or sell the smart devices to the user on condition that the user enters a service agreement for a certain period of time. In such embodiments, after the smart devices are installed, the service provider may activate and configure the smart devices remotely via the cellular network, the gateway at the location where the smart devices are installed, and an application for the service provider installed in the services distribution frame.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a system 100. System 100 extends the reach of a cellular network operator's service delivery to the end node or object within a customer's premises 130 such as a building or a group of buildings in the residential, enterprise, commercial, industrial, transport, field, and farm segments. System 100 comprises application service providers 110, cellular network 120, and premises 130. Application service providers (ASPs) 110 include ASPs (112, 114, and 116) that offer services to premises 130 via cellular network 120. In many embodiments, ASPs 110 contract with the cellular network operator of cellular network 120 to obtain authorization to offer services to the customer of premises 130. The customer of premises 130 may contract for the services from ASPs 110 indirectly via a contract for such services through the cellular network operator of cellular network 120. In other embodiments, the customer of premises 130 may contract directly with the ASPs 110 once a relationship is established between the cellular network operator and ASPs 110.

The ASPs 110 may each offer one or more different services for premises by providing applications through the cellular network core 125 to operate in the gateway node 140 within the services distribution frame 152. For example, the ASPs can provide monitoring, metering, and emergency services such as local private branch exchange (PBX) management, home or business automation services, security services, fire protection services, audio & video media/entertainment streaming, audio/video conferencing services, energy management and control services, data/personal computer connectivity services, video/photo camera services, temperature/environment management and control services, services related to other environment sensors, and the like.

The cellular network 120 may include cellular based data services through second generation (2G), third generation (3G), long term evolution (LTE), and/or other cellular based data network technologies. The cellular network 120 comprises a core 125 and facilitates the provision of data services to premises 130 via the gateway node 140. The cellular network operator of cellular network 120 may offer the customers of cellular network services provided by the ASPs 110. The cellular network provider may also, or as an alternative, offer customers a list of ASPs 110 with authorized services for use at the premises 130 so that the customers may contact and individually contract for services from the ASPs 110.

Premises 130 may comprise, for example, a home or a business capable of employing services offered by the ASPs 110. In particular, the premises 130 may comprise the gateway node 140, premises access network 170 with smart devices 172, and closed subscriber group network 180. The gateway node 140 may facilitate access to the ASPs 110 through the cellular network core 125 as well as provide functionality of a home enhanced node B, H(e)NB, to extend the cellular network operator's services to form a closed subscriber group network 180 by means of communications interfaces 160 within the premises 130. For instance, communications interfaces 160 may comprise a cellular network interface 162 such as a 3G radio module or an LTE module. The closed subscriber group network 180 may allow a limited set of users with connectivity access. When configured, only those users included in the access control list for the closed subscriber group network 180 are allowed to use the resources of the closed subscriber group network 180.

The gateway node 130 may have a mechanism to extend the network to the neighboring device to the gateway node 130 and may also act as a network traffic consolidation device. In some embodiments, the gateway node may have an automated way of provisioning services to the specification of the developer and/or end user or customer via the services distribution frame 150. In several embodiments, the gateway node 130 may establish a secure channel for data transfer between the smart devices 172 and a cloud based data mining application of an authorized ASP, such as ASP 112.

The gateway node 140 may comprise the services distribution frame 150 and the communications interfaces 160. The services distribution frame 150 may coordinate and manage services provided by one or more of ASPs 110. In some embodiments, the combination of logic of a home enhanced node B integrated with the services distribution frame 150 is referred to as a Secure Wireless Device Area Network (SWDAN) although many embodiments also offer physical local area network (LAN) connections via the gateway node 140.

The services distribution frame 150 may comprise a security policy and enforcement function (SPEF) 152 with an application services provider function 154. The SPEF 152 extends the security framework of the cellular network operator into the service delivered by the ASPs 110 into the premises 130, allowing the cellular network operator to control the delivery of ASP services. Secure service delivery may include, for example, the ability for secure service provisioning, device/service authentication, service life-cycle management (activation, de-activation, suspension, re-activation, termination) and service policy enforcement. The SPEF 152 allows the cellular network operator to, e.g., add, remove activate, deactivate, update, and upgrade smart devices 172 for provision of services by the ASPs 110.

The SPEF 152 includes the application services provider function 154 to authenticate and restrict access to smart devices 172 of the premises access network 170 for the purposes of providing the ASPs 110 with access within the premises access network 170 only to the extent necessary to provide services authorized by the customer of premises 130. For instance, the ASP 116 may be contracted to provide home automation services to the premises 130 by the customer. The ASP 116 may provide the home automation services through the application service provider function 154 of the SPEF 152. The SPEF 152 may authenticate the ASP 116, provide a secure channel of communication between the ASP 116 and the smart devices 172 that are classified as home automation devices and assign a priority to the communications between the ASP 116 and other ASPs 110 that may provide services to premises 130. The ASP 116 may then communicate instructions or commands to the smart devices 172 that are classified as home automation devices to perform the contracted home automation services for the customer. The priority assigned to the ASP 116 for the home automation services may have a lower priority than, e.g., an ASP providing security services.

The communications interfaces 160 may facilitate communications between the smart devices 172 and the ASPs 110 via the smart device interface(s) 164. The services distribution frame 150, through the smart device interface(s) 164, may execute code to automatically recognize, identify, authenticate, configure, and activate the smart devices 172 if the customer intends to activate the smart devices 172. In particular, the services distribution frame 150 may detect the presence of a smart device within the premises access network 170 in response to installation of the smart device and communicate with the smart device to identify the smart device. Communicating with the smart device may comprise establishing communication with the device and receiving device identification for the smart device that uniquely identifies the smart device such as a subscriber identity module (SIM) of a cellular phone. In response to an indication that a customer intends to activate the smart sensor, the services distribution frame 150 may authenticate the smart device and establish communications with the smart device through a secure encryption protocol. Establishing communications with the smart device through the secure encryption protocol may comprise establishing a secure channel for data transfer between the smart sensor and one of the ASPs 110.

Figure 2:
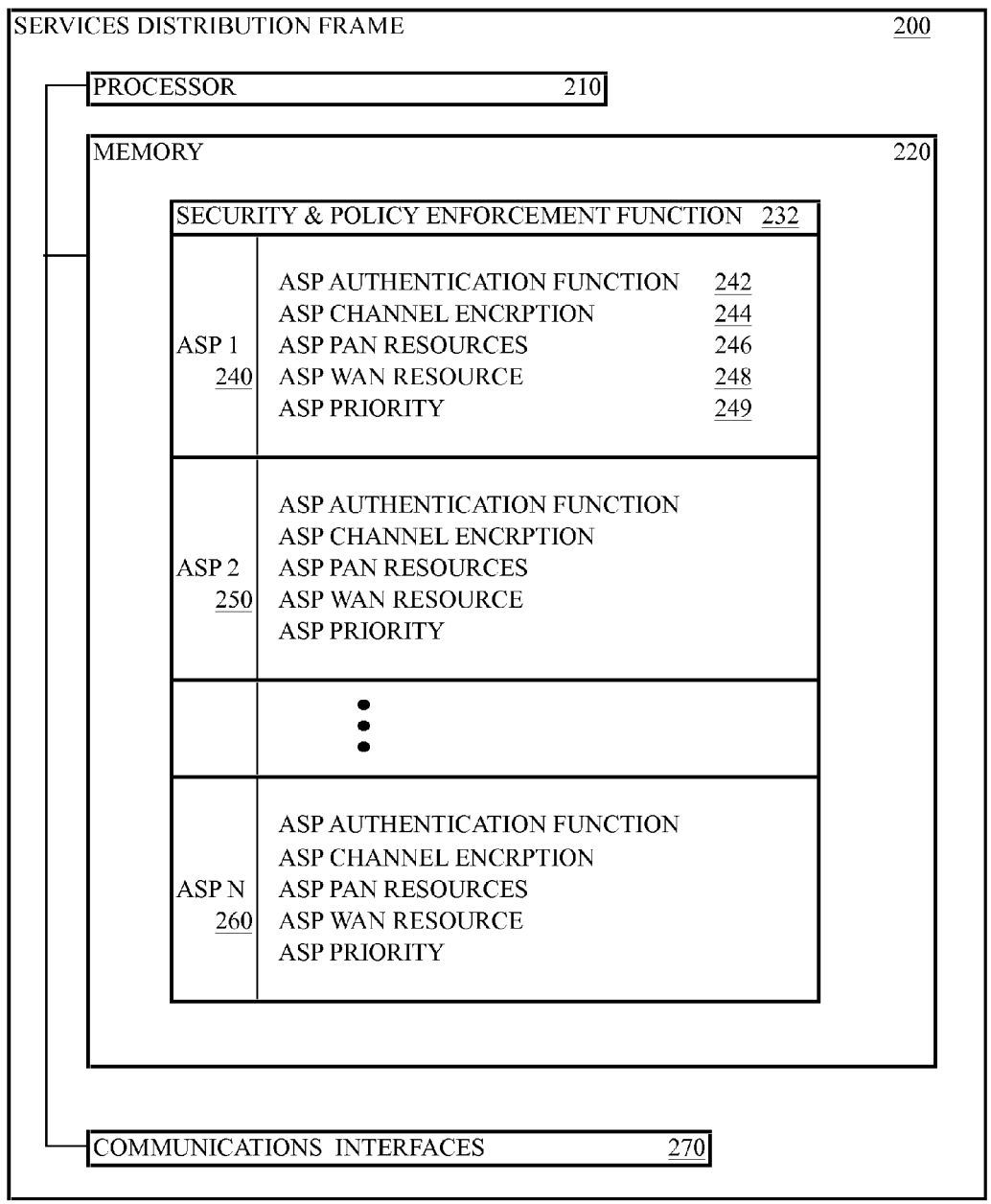
FIG. 2 depicts an embodiment of an apparatus to provide a security policy and enforcement function.

FIG. 2 depicts an embodiment of a services distribution frame 200 such as the services distribution frame 150 illustrated in FIG. 1. The services distribution frame 200 may be logic comprising hardware and code to implement functionality including the provision of application services from application service providers (ASPs) in a secure code execution environment. A security and policy enforcement function (SPEF) 232 along with the premises services distribution frame 200 places the cellular network operator in a unique position to engage service partners in delivering services beyond connectivity services to the premises. In the present embodiment, the services distribution frame 200 comprises a processor 210, a memory 220, and communications interfaces 270.

The processor 210 may execute code from the memory 220 to implement some or all of the functionality of the services distribution frame 200. Examples of a memory 220 may include tangible media such as a semiconductor or solid-state memory, magnetic tape, a removable computer diskette, cache, flash memory, a random access memory (RAM), a read-only memory (ROM), a rigid magnetic disk, and an optical disk. Memory 220 may include one or more of these types of memory or other types of memory for storage and retrieval of data.

The memory 220 may comprise code. The code may comprise the SPEF 232 to securely coordinate services provided by multiple application service providers. The SPEF 232 may comprise application service providers' functions, ASP1 240, and ASP2 250 through ASPN 260.

Note that while the present embodiment includes a services distribution frame that comprises a processor and memory, in other embodiments, the services distribution frame may not comprise a processor and memory but may share a processor and memory with other functionality of a node such as the gateway node 140 in FIG. 1. In still other embodiments, the services distribution frame may utilize other logic such as state machines or dedicated functionality semiconductor circuits.

The cellular network operator provisions the SPEF 232 once an ASP wanting to provide services to the premises establishes a business relationship with the cellular network operator. The SPEF 232 may authenticate one or more application service providers to provide services to the premises, encrypt channels allocated to the application service providers while the application service providers are provisioned to provide services to the premises through a premises access network, and allocate channels to a wide area network associated with the services distribution frame 200. In particular, the SPEF 232 comprises a framework for securely establishing services with each ASP independently and individually providing the access for provision of services to the premises via the communications interfaces 270 so that each ASP (240 and 250 through 260) receives only the right access required for provisioning services to the premises. Each ASP (240 and 250 through 260) is authenticated and entrusted with resources associated with that specific ASP. For example, ASPJ 240 may provide services to the premises such as audio/video conferencing services. The SPEF 232 incorporates the ASP authentication function (AAF) 242 that has the ASP service authentication key Kr embedded. The AAF 242 requires the serving ASPJ 240 to authenticate to the services distribution frame 200 to be able to provide services to the premises.

The SPEF 232 incorporates the ASP channel Encryption Function (AEF) 244 to encrypt the channel allocated to the ASPJ 240 while the ASP Premises Access Network (APAN) 246 is the local connectivity resource provisioned to the ASPJ 240 for serving the premises. The APAN 246 can allocate any of the wireless (WiFi, Bluetooth, Zigbee, IS014443, . . . ) or wired (RS485, 802.3, . . . ) resources available on the services distribution frame 200 to the ASPJ 240.

The SPEF 232 incorporates the ASP WAN resource (AWAN) 248 to allocate a Circuit Switched (CS) or Packet Switched (PS) channel to the WAN. And the SPEF 232 incorporates the ASP Priority function (APRI) 249 to set the priority level for the ASP services on the PAN and the WAN. Note that the SPEF 232 is capable of supporting a wide range of quality of service (QoS) requirements via the APRI 249 as well as through other functionality.

In some embodiments, the services distribution frame 200 further comprises code to establish communication with the cellular network core that involves authenticating the services distribution frame 200 with the cellular network core to verify the services distribution frame 200 is authorized to receive services from application service providers through the cellular network core.

In some embodiments, the services distribution frame 200 further comprises code to detect the presence of a smart device within the premises access network in response to installation of the smart device and to communicate with the smart device to identify the smart device. In such embodiments, the memory 220 further comprises code to authenticate a smart device and the communications interfaces 270 to establish communications with the smart device through a secure encryption protocol.

Figure 3:
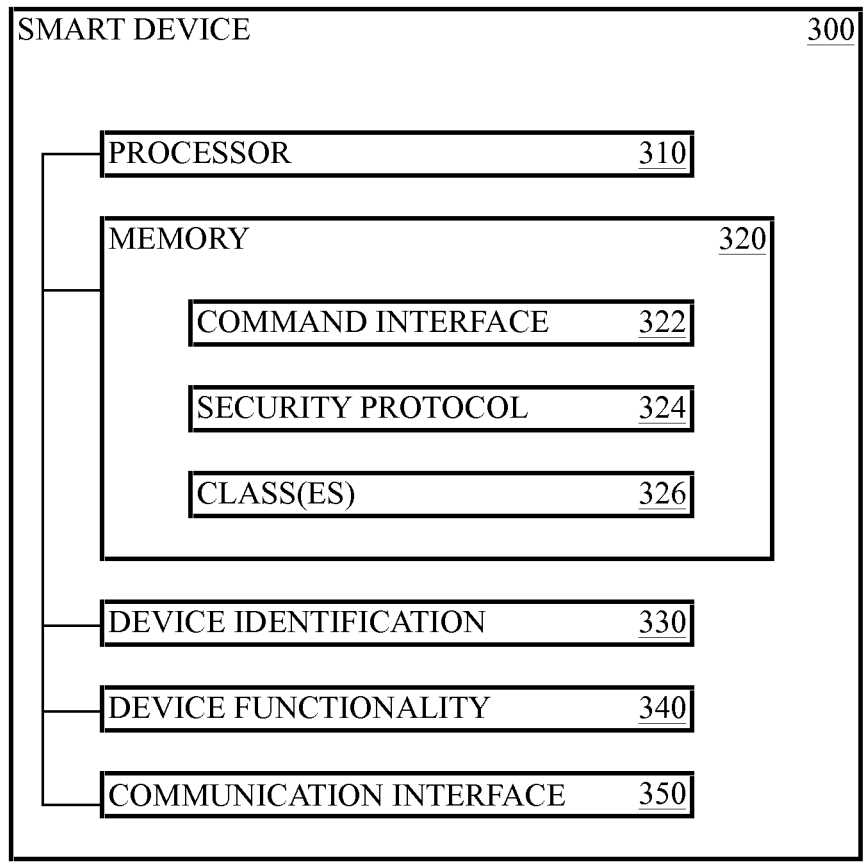
FIG. 3 illustrates an embodiment of a smart sensor.

FIG. 3 depicts an embodiment of a smart device 300. The smart device 300 may be associated with one or more class(es) 326 such as security switches, power switches, dimmer switches, door locks, temperature sensors, humidity sensors, smoke sensors, infrared sensors, vibration sensors, glass breakage sensors, smog sensors, heat sensors, energy management and control devices, voltage sensors, current sensors, audio and video conferencing devices, audio and video streaming entertainment devices, data and computer connectivity devices, video/photo camera devices, PBX management devices, and the like.

The smart sensor 300 may accept commands such as commands to reset and update firmware and may include a unique identification such as a device identification 330 that uniquely identifies the smart device from other smart devices on the premises. The smart device 300 may comprise a device processor 310, a device memory 320, the device identification 330, device functionality 340, and a communication interface 350.

A device memory 320 may comprise code to respond to instructions and the device processor 310 may execute the code to respond to the instructions. Examples of a memory 320 may include tangible media such as a semiconductor or solid-state memory, magnetic tape, a removable computer diskette, cache, flash memory, a random access memory (RAM), a read-only memory (ROM), a rigid magnetic disk, and an optical disk. Memory 220 may include one or more of these types of memory or other types of memory for storage and retrieval of data.

In the present embodiment, the device memory 320 comprises code including a command interface 322, a security protocol 324, and class(es) 326. The command interface 322 may provide an interface for the ASPs to implement services related to the smart sensor 300. For example, the smart sensor 300 may comprise an infrared heat sensor, an alarm, and an emergency light. The security protocol 324 may provide a one or more keys, authentication credentials such as a digital certificate, security policy information related the class(es) 326 associated with the smart device 300, and priority information provided by a cellular network core for communications with an ASP engaged to provide fire protection services. The class(es) 326 may include a classification of fire protection. The communications interface 350 may facilitate communication between the processor 310 and the ASP with the security protocol 324 provided to the smart device 300 by the cellular network provider based upon the class 326 of fire protection falling within the services for which the ASP is authorized to provide for the premises. The ASP may transmit an instruction to the smart device 300 via the communication interface 350 to provide information about the status of the infrared sensor. In response to an indication if infrared light by the infrared sensor, the smart device 300 may transmit an indication of the infrared sensor event via the communication interface 350. The ASP may call, text, and email the customer to verify whether or not the infrared source detected by the infrared sensor is a result of a fire and if no response is obtained or no one answers the phone, text, or email, the ASP may alert the closest fire department of the alarm.

If the customer answers with a statement that there is no fire, the ASP may transmit a reset signal to the smart sensor 300 via the communication interface 350. The smart sensor 300 may receive the command to reset and process the command via the command interface 322. In response to the reset command, the command interface 322 may reset the infrared sensor. If the alarm continues, the ASP may further send a command to the smart device 300 to run a diagnostic routine on the infrared sensor to determine whether the infrared sensor can be confirmed to be a faulty sensor.

In further embodiments, the communications interface 350 may facilitate daisy-chaining a network of smart devices with smart device 300 to provide a communications path between the smart devices and the gateway node.

Figure 4:
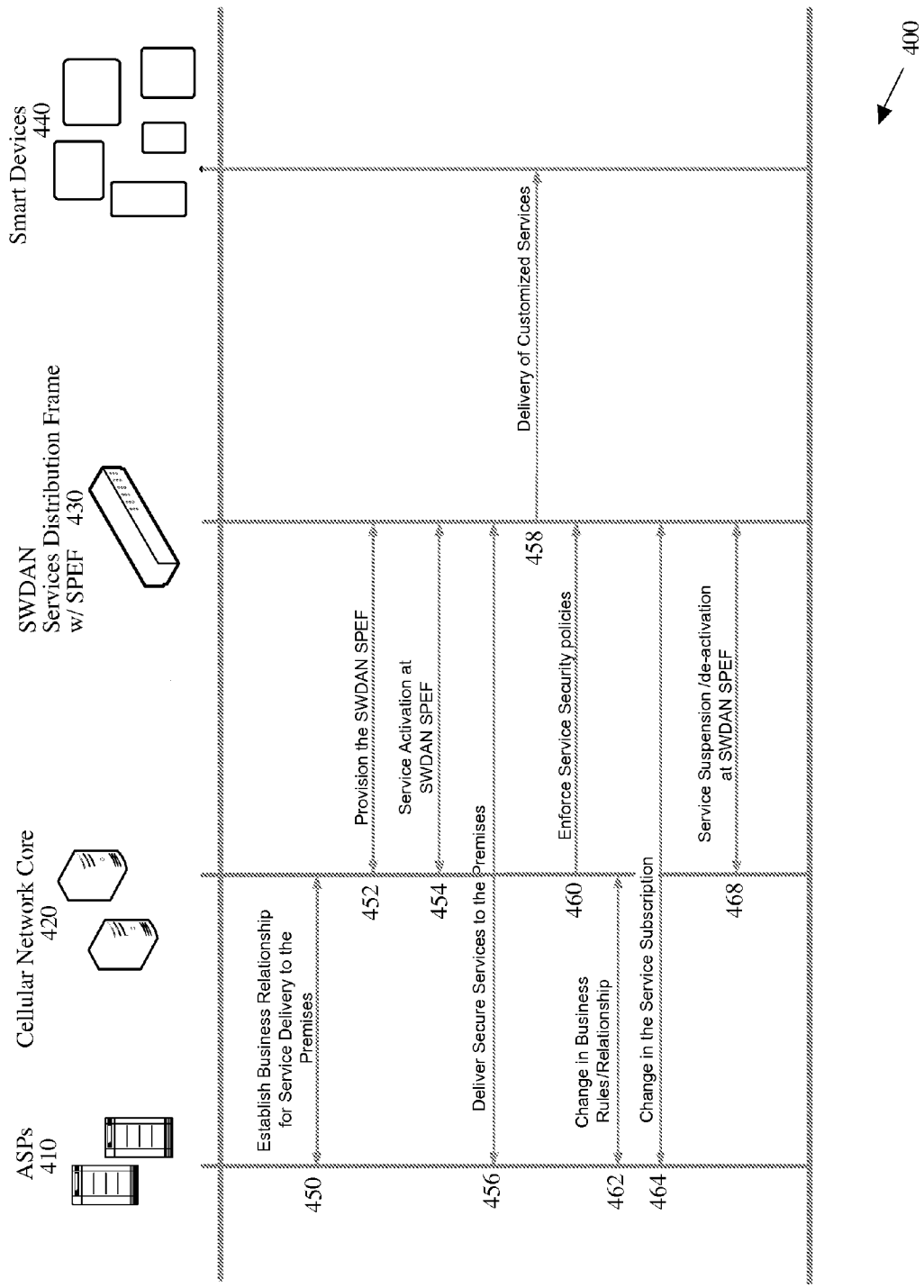
FIG. 4 illustrates an embodiment of a services provisioning scheme.

FIG. 4 illustrates an embodiment of a scheme 400 for provision of application services by application service providers (ASPs) 410 to premises via a cellular network core 420. The premises comprise a secure wireless device area network (SWDAN) having a services distribution frame with a security and policy enforcement function (SPEF) 430 such as the gateway node 140 in FIG. 1 and smart devices 440. The SPEF 430 along with the premises services distribution frame places the cellular network operator in a unique position to engage service partners in delivering services beyond connectivity services to the premises. In many embodiments, the scheme may enable the cellular network operator to be a nodal service provider for all premises services.

The scheme 400 begins at action 450 where the ASPs 410 and the cellular network operator establish a business relationship for service delivery to the premises. At action 452, the cellular network core 420 provides security configurations to the services distribution frame with the SPEF 430 to facilitate the provision of application services from the ASPs 410 to the premises. In particular, the cellular network core 420 may provide the encryption/de-cryption keys to the ASPs 410 and the SPEF 430 to allow the ASP to communicate with the SPEF 430. In further embodiments, the cellular network core 420 may provide authentication credentials to the ASPs 410 and the SPEF 430 to facilitate secure communication for the ASP to communicate with the SPEF 430. In many embodiments, the cellular network core 420 may provision both authentication credentials, and channel encryption/de-cryption keys to the ASPs 410 and the SPEF 430 and set the premises resource access policies for the ASPs 410 and the SPEF 430 to allow the ASP to communicate with the SPEF 430.

At action 454, the cellular network core 420 activates the services of the ASPs 410 at the services distribution frame with the SPEF 430. The activation of the services may include the provision of, e.g., premises access network (PAN) and wide area network (WAN) resource allocation policies to the ASPs 410 and the SPEF 430 to facilitate the establishment of accessible resources for the ASPs 410. The cellular network core 420 may also provide priority information to the SPEF 430 for the ASPs 410. For example, ASPs 410 contracted to provide energy management and control services may have access to smart devices 440 in classifications of energy management as well as home automation to monitor and manage power usage by equipment and light throughout the premises in accordance with preferences or policies established by the customer.

At action 456, the ASPs 410 provides the secure application services to the premises. For instance, the ASPs 410 may monitor, meter, and/or provide emergency services to the premises based upon feedback from smart devices 440 related to the application services being provided.

At action 458, the services from the ASPs 410 deliver customized services to the smart devices 440 on the premises. For example, the ASPs 410 may provide configuration updates, firmware updates, and commands to the smart sensors 440 to implement custom services contracted by the customer at the premises.

At actions 460, the cellular network core may enforce service security policies. For instance, the cellular network core 420 may provide an updated or upgraded set of security policies to the SPEF 430. In some embodiments, enforcing service security policies may involve updating the authorizations such as security policies related to the premises access network, authentication credentials related to the SPEF 430 and the cellular network core 420, encryption/de-cryption keys for the SPEF 430 and the cellular network core 420, or priority policies associated with the ASPs 410 for interaction between the cellular network core 420 and the SPEF 430. In still further embodiments, enforcing service security policies may involve modification of the services available to the premises from ASPs for certain classes of smart devices 440 by updating the security policies enforced by the SPEF 430.

At action 462, the ASPs 410 and the cellular network operator 420 change their business relationship or the rules related to the services provided by the ASPs 410. At action 464, the ASPs 410 may communicate a change in the application service subscription provided to the premises by the ASPs 410. For instance, the ASP's may transmit updated application services for monitoring and metering the smart devices 440 and/or updated configurations for provision of data from the smart sensors. Alternatively, the change in the service subscription may involve the cancellation of services provided to the premises by the customer at the premises.

At action 468, the cellular network core 420 may suspend the provision of services to the premises by the ASPs 410 by deactivating the services from the ASPs 410. For example, the cellular network operator may disable or remove the provision for services from the ASPs 410 in the SPEF 430 or disable the smart devices 440 associated with the provision of services at the premises by the ASPs 410. In many embodiments, the cellular network operator may invalidate authentication credentials, encryption keys, premises access network policies, wide area network policies, and priority information associated with the establishment of services between the ASP's and the premises.

Figure 5:
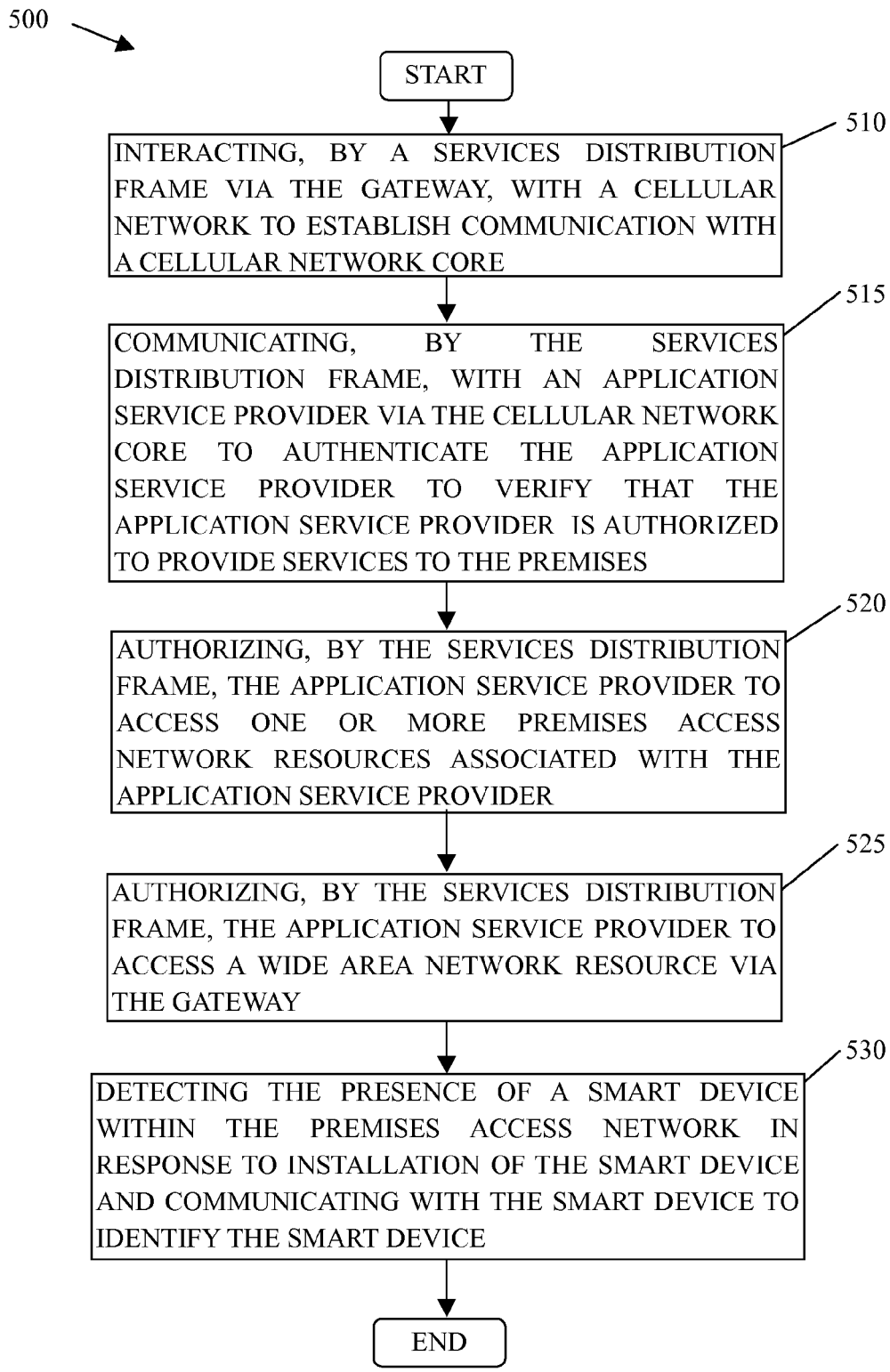
FIG. 5 illustrates a flow chart of an embodiment to extend and manage the cellular network to devices behind the gateway.

FIG. 5 illustrates a flow chart 500 of an embodiment. The flow chart begins at element 510 with interacting, by a services distribution frame via the gateway, with a cellular network to establish communication with a cellular network core. In many embodiments, the establishment of communications with the cellular network core comprises authentication of the cellular network core by, e.g., a technician, a customer, and/or a third party authentication service. Authentication of the cellular network core may involve the provisioning of authentication credentials such as a form of identification. Upon authenticating the cellular network core, the services distribution frame, or specifically a security policy and enforcement function of the services distribution frame may receive one or more authentication credentials to facilitate secure communications with the cellular network core.

At element 515, the services distribution frame may communicate with an application service provider via the cellular network core to authenticate the application service provider to verify that the application service provider is authorized to provide services to the premises. In many embodiments, the authentication of the application services provider involves the provision of one or more authentication credentials such as a correct identity and associated set of credentials from the cellular network core to the application service provider and the services distribution frame.

At element 520, the services distribution frame authorizes the application service provider to access one or more premises access network resources associated with the application service provider. For example, access to premises access network resources may include access to audio and video conferencing equipment for provisioning of video conferencing services to the premises. The services distribution frame may then authorize the application service provider to access a wide area network resource via the gateway at element 525.

In further embodiments, the services distribution frame may detect the presence of a smart device within the premises access network in response to installation of the smart device and may communicate with the smart device to identify the smart device at element 530.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Note that a tangible storage medium does not store signals but stores one or more values representative of data. A medium can be an electronic, magnetic, optical, electromagnetic, infrared, or semiconductor system (or apparatus or device) or a propagation medium. Examples of a computer-readable storage medium include tangible media such as semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates wireless display performance enhancement. It is understood that the form of the embodiments shown and described in the detailed description and the drawings are to be taken merely as examples. It is intended that the following claims be interpreted broadly to embrace all variations of the example embodiments disclosed.

Although the present disclosure has been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for secure device area network on premises via a gateway, the method comprising:
    interacting, by a services distribution frame via the gateway, with a cellular network to establish communication with a cellular network core;
    communicating, by the services distribution frame, with an application service provider via the cellular network core to authenticate the application service provider to verify that the application service provider is authorized to provide services to the premises, wherein the services distribution frame is on the premises;
    authorizing, by the services distribution frame, the application service provider to access one or more premises access network resources associated with the application service provider; and
    authorizing, by the services distribution frame, the application service provider to access a wide area network resource via the gateway.

2. The method of claim 1, further comprising detecting the presence of a smart device within the premises access network in response to installation of the smart device and communicating with the smart device to identify the smart device.

3. The method of claim 2, wherein communicating with the smart device comprises establishing communication with the device and receiving a device identification for the smart device that uniquely identifies the smart device.

4. The method of claim 1, further comprising authenticating a smart device and establishing communications with the smart device via a security and policy enforcement function.

5. The method of claim 4, further comprising remotely performing an operation on the smart device via a security and policy enforcement function, wherein performing the operation on the smart device comprises activating the smart device, deactivating the smart device, or updating a firmware of the smart device.

6. The method of claim 4, wherein establishing communications with the smart device via the security and policy enforcement function comprises establishing a secure channel for data transfer between the smart sensor and a remote server via the cellular network core.

7. The method of claim 1, further comprising establishing a secure channel, by the services distribution frame, allocated to the application service provider for access to one or more premises access network resources associated with the application service provider.

8. The method of claim 1, wherein interacting, by the services distribution frame via the gateway, with a cellular network to establish communication with a cellular network core comprises authenticating the gateway with the services distribution frame to the cellular network core to verify the gateway is authorized to receive services from application service providers through the cellular network core.

9. The method of claim 1, wherein communicating, by the services distribution frame, with the application service provider via the cellular network core to authenticate the application service provider to verify that the application service provider is authorized to provide services to the premises comprises establishing communication with the application service provider via a service authentication key.

10. The method of claim 1, wherein authorizing, by the services distribution frame, the application service provider to access the wide area network resource via the gateway comprises allocating to the application services provider by the services distribution frame, a circuit switched or packet switched channel to the wide area network coupled with the gateway.

11. An apparatus to create a secure device area network for premises, the apparatus comprising:
  a services distribution frame to coordinate services provided by multiple application service providers; and
  a security and policy enforcement function to authenticate an application service provider to provide services to the premises, to encrypt a channel allocated to the application service provider while the application service provider is provisioned to provide services to the premises through a premises access network, and to authorize allocation of and allocate a channel to a wide area network associated with the apparatus.

12. The apparatus of claim 11, further comprising a cellular network communications interface to establish communications with a cellular network core through a cellular network.

13. The apparatus of claim 12, wherein the services distribution frame further comprises code to establish communication with the cellular network core, wherein establishing communication with the cellular network core comprises authenticating the apparatus with the services distribution frame to the cellular network core to verify the apparatus is authorized to receive services from application service providers through the cellular network core.

14. The apparatus of claim 11, further comprising a smart device coupled with the apparatus, the smart device comprising a device identification that uniquely identifies the smart device from other smart devices on the premises, the smart device comprising:
  a device processor;
  a device memory comprising code to respond to instructions; and
  a communications interface to facilitate communication between the processor and to communicate with the services distribution frame and to receive the instructions.

15. The apparatus of claim 11, wherein the services distribution frame further comprises code to detect the presence of a smart device within the premises access network in response to installation of the smart device and to communicate with the smart device to identify the smart device.

16. The apparatus of claim 11, further comprising memory comprising code to authenticate a smart device and establish communications with the smart device through a security and policy enforcement function.

17. A computer program product for secure device area network on premises via a gateway, wherein the computer program product does not comprise a transitory signal, the computer program product comprising:
  a computer useable medium having a computer useable program code embodied therewith, the computer useable program code comprising: computer useable program code configured to perform operations, the operations comprising:
  interacting, by a services distribution frame via the gateway, with a cellular network to establish communication with a cellular network core;
  communicating, by the services distribution frame, with an application service provider via the cellular network core to authenticate the application service provider to verify that the application service provider is authorized to provide services to the premises, wherein the services distribution frame is on the premises;
  authorizing, by the services distribution frame, the application service provider to access one or more premises access network resources associated with the application service provider; and
  authorizing, by the services distribution frame, the application service provider to access a wide area network resource via the gateway.

18. The computer program product of claim 17, wherein the operations further comprise detecting the presence of a smart device within the premises access network in response to installation of the smart device and communicating with the smart device to identify the smart device.

19. The computer program product of claim 17, wherein the operations further comprise forming a closed subscriber group within the premises.

20. The computer program product of claim 17, wherein the operations further comprise encrypting a channel, by the services distribution frame, allocated to the application service provider for access to one or more premises access network resources associated with the application service provider.

* * * * *